United States Patent
Fages

(10) Patent No.: US 10,975,941 B2
(45) Date of Patent: Apr. 13, 2021

(54) ICE BREAKING SEAL

(71) Applicant: Ratier-Figeac SAS, Figeac (FR)

(72) Inventor: Christian Fages, Figeac (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 16/034,419

(22) Filed: Jul. 13, 2018

(65) Prior Publication Data
US 2019/0017582 A1 Jan. 17, 2019

(30) Foreign Application Priority Data

Jul. 13, 2017 (EP) .................................. 17305940

(51) Int. Cl.
| | | |
|---|---|---|
| *F16H 25/24* | (2006.01) | |
| *F16J 15/3284* | (2016.01) | |
| *F16J 15/32* | (2016.01) | |
| *F16H 25/22* | (2006.01) | |
| *F16J 15/328* | (2016.01) | |

(52) U.S. Cl.
CPC ..... *F16H 25/2418* (2013.01); *F16H 25/2204* (2013.01); *F16J 15/32* (2013.01); *F16J 15/328* (2013.01); *F16J 15/3284* (2013.01)

(58) Field of Classification Search
CPC ..... F16H 25/2418; F16J 15/16; F16J 15/3284
See application file for complete search history.

(56) References Cited

U.S. PATENT DOCUMENTS

| | | | | |
|---|---|---|---|---|
| 2,793,538 A | * | 5/1957 | Sears | F16H 25/2418 74/89.4 |
| 3,669,460 A | * | 6/1972 | Wysong | F16H 25/2418 277/354 |
| 4,407,511 A | * | 10/1983 | Benton | F16H 25/2418 277/354 |
| 4,905,533 A | * | 3/1990 | Benton | F16H 25/2418 277/354 |
| 5,029,877 A | * | 7/1991 | Fedeli | F16H 25/2418 277/354 |
| 5,324,047 A | * | 6/1994 | Organ | F16H 25/2418 277/354 |
| 7,500,409 B2 | * | 3/2009 | Yatsushiro | F16H 25/2418 277/354 |
| 9,488,255 B2 | * | 11/2016 | Ishizaki | F16H 25/2418 |
| 2015/0233457 A1 | | 8/2015 | Heck et al. | |
| 2016/0107287 A1 | * | 4/2016 | Bajaj | B24B 37/22 51/298 |
| 2016/0238114 A1 | * | 8/2016 | Oka | F16H 25/2204 |

FOREIGN PATENT DOCUMENTS

| | | |
|---|---|---|
| CN | 106081122 A | 11/2016 |
| JP | H0544810 A | 2/1993 |
| JP | 2017003112 A | 1/2017 |
| WO | 2017039619 A1 | 3/2017 |

OTHER PUBLICATIONS

Extended European Search Report for International Application No. 17305940.3 dated Jan. 18, 2018, 7 pages.

* cited by examiner

*Primary Examiner* — Bobby Rushing, Jr.
(74) *Attorney, Agent, or Firm* — Cantor Colburn LLP

(57) ABSTRACT

An ice breaking seal for a ball screw comprises a first, ice breaking section and a second, sealing section formed integrally with the ice breaking section. The ice breaking section is formed of a polymeric material and has a first hardness. The sealing section is formed of a polymeric material and has a second hardness, which is lower than the first hardness.

17 Claims, 3 Drawing Sheets

ICE BREAKING SEAL

FOREIGN PRIORITY

This application claims priority to European Patent Application No. 17305940.3 filed Jul. 13, 2017, the entire contents of which is incorporated herein by reference.

TECHNICAL FIELD

The present disclosure relates to seals, and in particular ice breaking seals for use in ball screws or other rotary actuators.

BACKGROUND

Ball screws are a well-known form of rotary actuator and comprise a rotary ball screw received in a ball nut. A plurality of balls is provided between the ball screw and the ball nut. Rotation of the ball screw or the ball nut results in translation of the ball screw or the ball nut. A seal is provided between the ball nut and the ball screw so as to retain lubricant within the ball nut, thereby facilitating relative rotation of the ball screw and ball nut. Ball screws are used in a wide range of atmospheric conditions and in certain operating conditions may be prone to the accumulation of ice on the ball screw shaft. This may interfere with the proper operation of the ball screw, so it is known to also provide an ice breaking element between the ball screw and ball nut.

In a known arrangement, a metallic ice breaking element is formed, for projecting into the thread of the ball screw. A sealing element is then attached to the ice breaking element, for example by moulding or overmoulding. This construction is effective but may be heavy and difficult to accurately manufacture.

SUMMARY

From a first aspect, the disclosure provides an ice breaking seal for a ball screw or rotary actuator comprising a first, ice breaking section and a second, sealing section formed integrally with the ice breaking section. The ice breaking section is formed of a polymeric material having a first hardness. The sealing section is formed of a polymeric material having a second hardness, which is lower than the first hardness.

In embodiments, the ice breaking section and the sealing section are annular, the ice breaking section at least partially axially overlapping the sealing section.

In embodiments, a radial gap may be formed between a distal portion of the ice breaking section and a distal portion of the sealing section to allow radially outward deflection of the sealing section.

In embodiments, the ice breaking section may comprise a radially outer mounting portion from which an ice breaking element and a sealing element of the sealing section extend. The outer mounting portion of the ice breaking element may comprise a further polymeric material.

In embodiments, the ice breaking section is made from synthetic rubber.

In various embodiments, the first hardness is over 80 Shore, for example 85 Shore.

In various embodiments, the sealing section is made from synthetic rubber.

In various embodiments, the second hardness is in the range 20 to 40 Shore.

In various embodiments, the ice breaking section and sealing section are formed together in an additive manufacturing process, for example a photopolymerisation process.

The disclosure also provides a ball screw assembly comprising a ball screw received in a ball nut, the ball nut mounting an ice breaking seal in accordance with the disclosure for engagement with the ball screw.

The disclosure also provides a method of manufacturing an ice breaking seal comprising a first, ice breaking section and a second sealing section. The method comprises forming the ice breaking section) and sealing section together from polymeric materials using an additive manufacturing process, such that the ice breaking section has a first hardness and the sealing section has a second hardness, which is lower than the first hardness.

In various embodiments, the additive manufacturing process is a photopolymerisation process.

In various embodiments, the hardness of the icebreaking seal at any given location is achieved by co-depositing of materials having different hardnesses, the proportion of the materials deposited at any location determining the hardness of the material at that location.

In various embodiments, the ice breaking section and/or the sealing section are made from synthetic rubber.

In various embodiments, the first hardness is over 80 Shore and/or the second hardness is in the range 20 to 40 Shore.

BRIEF DESCRIPTION OF DRAWINGS

An embodiment of the present disclosure will now be described, by way of example only, with reference to the accompanying drawings in which.

DETAILED DESCRIPTION

Figure 1:
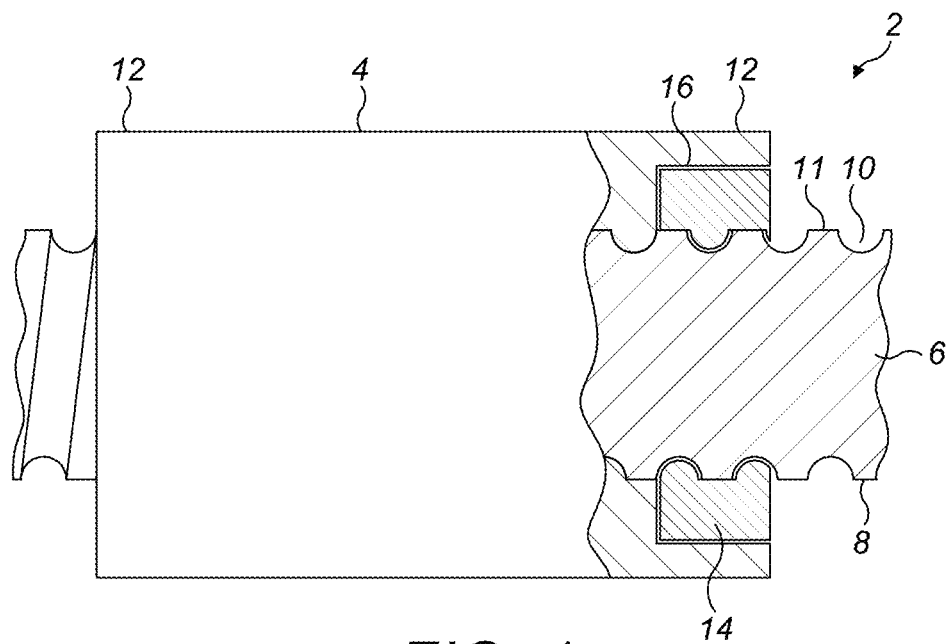
FIG. 1 illustrates, schematically, a ball screw assembly incorporating an ice breaking seal in accordance with the disclosure.

With reference to FIG. 1, a ball screw assembly 2 comprises a ball nut 4 and a ball screw 6. The external diameter 8 of the ball screw 6 is formed with a helical channel 10. A land 11 is formed between adjacent turns of the channel 10. An internal diameter of the ball nut is also formed with a helical channel (not shown). A plurality of balls (not shown) is received in the channels, the balls acting to facilitate rotation of the ball screw 6 relative to the ball nut 4. In use, one of either the ball screw 6 or the ball nut 4 will be rotated but located axially such that the other of the ball screw 6 and the ball nut 4 will move axially to provide an actuating movement.

The ball nut 4 mounts, at either end 12, an ice breaking seal 14. Each end 12 of the ball nut 4 may be provided with a bore 16 to receive the ice breaking seal 14. The ice breaking seal 14 firstly serves to retaining lubricant within the ball nut 4. It also serves to break ice which may accumulate on the ball screw 6 in use.

Figure 2:
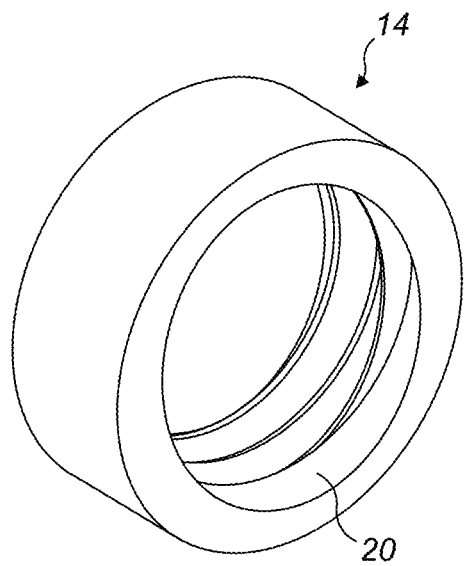
FIG. 2 is a perspective view of a first embodiment of seal in accordance with the disclosure.
Figure 3:
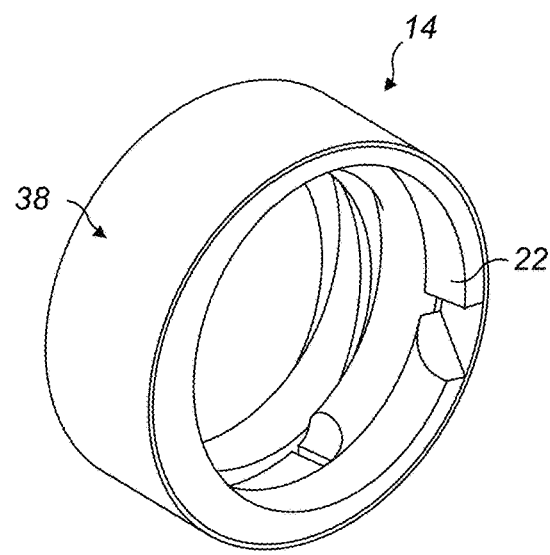
FIG. 3 is a further perspective view of the ice breaking seal of FIG. 2.
Figure 4:
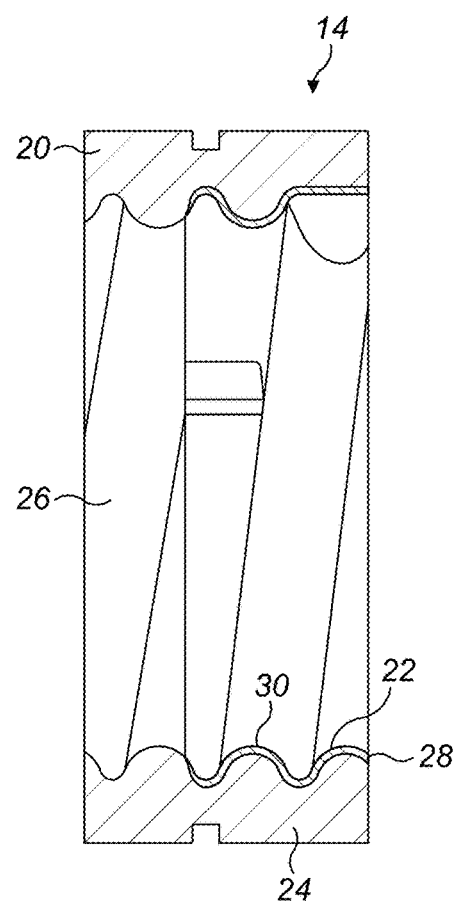
FIG. 4 is a schematic cross section taken through the ice breaking seal of FIG. 2.

As shown in FIGS. 2 to 4, the ice breaking seal 14 is a unitary, one-piece annular element having a first, ice breaking section 20 and a second, sealing section 22. The ice breaking section 20 and sealing section 22 are formed integrally by an additive manufacturing process as will be described further below.

The ice breaking section 20 in this embodiment comprises an annular body 24 which extends substantially along the entire axial length of the seal 14. It comprises an ice breaking element 26 which projects radially inwardly from the annular body 24. The ice breaking element 26 projects into the channel 10 provided on the outer diameter 8 of the ball screw 6 and also engages the adjacent land 11 and comprises a relatively hard ice breaking edge which scrapes ice from the surface of the channel 10.

The ice breaking section 20 is formed from a first polymeric material. This polymeric material is relatively hard and may have a hardness of over 80 Shore, for example 85 Shore. This provides sufficient rigidity and strength to the ice breaking element 26, to allow it to break ice which may have accumulated in the ball screw channel 10 or on the adjacent land 11. The hard material also provides a robust fixture of the seal 14 within the ball nut bore 16. A suitable base material for the ice breaking section 20 may be a synthetic rubber material.

Integrally formed with the ice breaking section 20 is a sealing section 22. This sealing section is integrally attached to the ice breaking section 20 at an interface region 28. The sealing section 22 comprises a sealing element 30 which extends radially inwardly from the ice breaking section 20 for engagement in the helical channel 10 on the outer diameter 8 of the ball screw 6. In this embodiment, the sealing section 22 is effectively formed as a continuous layer on the underlying ice breaking section 20.

The sealing section 22 is formed with a lower hardness than that of the ice breaking section 20 so as to allow it to deform and properly perform its sealing function. A typical hardness for the sealing section 22 may be in the range 20 to 40 Shore. A suitable base material for the sealing section 22 may be a synthetic rubber.

As discussed above, the ice breaking seal 14 is produced by an additive manufacturing process. A wide variety of additive manufacturing processes are known and any such process which allows the deposition of two or more polymeric materials may be used to manufacture the seal 14.

Figure 5:
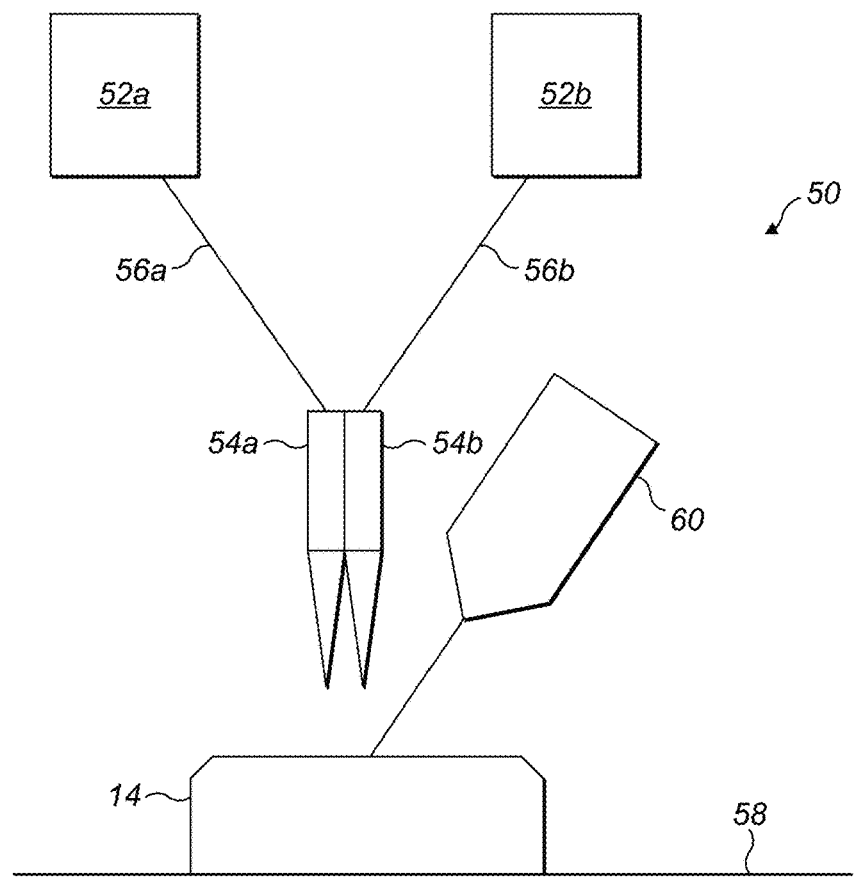
FIG. 5 illustrates, schematically, an apparatus for manufacturing the ice breaking seal.

One technique which may be particularly suitable is that of photopolymerisation. This technique is illustrated in FIG. 5, which shows, schematically, a photopolymerisation apparatus 50.

The photopolymerisation apparatus 50 comprises supply sources 52a, 52b for respective photo-curable polymeric materials. The polymeric materials are fed to respective deposition nozzles 54a, 54b via supply lines 56a, 56b. The nozzles 54a, 54b deposit the polymeric materials onto a bed 58 and the deposited material is cured by a UV or other source 60. The bed 58 and/or nozzles 54a, 54b are moved such that the materials are deposited and cured in the appropriate positions. The workpiece, in this case the ice breaking seal 14, is built up layer by layer. There are a number of commercially available machines of this type, for example PolyJet 3D Printers produced by Stratasys Limited. No further details need therefore be provided of the process or apparatus.

In the present case, the supply sources 52a, 52b contain appropriate materials for the ice breaking section 20 and sealing section 22 of the ice breaking seal 14. The respective materials are laid down and cured in an appropriate pattern in a layer by layer manner to produce the appropriate shape of seal 14.

The desired hardness of the respective sections of the seal 14 may be obtained by co-depositing the polymeric materials in a desired proportion. Thus the local hardness of the seal body can be obtained by choosing the appropriate proportion of polymeric materials to be co-deposited in the desired position. For example supply 52a may contain a relatively hard material, suitable for the icebreaking section 20 and supply 52b may contain a relatively soft material, suitable for the sealing section 22. A transitional zone of intermediate hardness may be formed by co-deposition of the two materials in appropriate relative proportions of the materials. Of course, the materials chosen for deposition should be compatible and stable when deposited.

The respective materials and hardness of the ice breaking section 20 and the sealing section 22 allow both sections to perform their respective functions effectively.

The ice breaking seal 14 produced by the method is a one-piece, integrally formed component. This may provide certain advantages over the prior art. For example, there is no need to separately manufacture multiple parts which then have to be assembled together. This avoids, for example, the need for tolerances between the two parts.

It will be appreciated that the description above is of a non-limiting embodiment of the disclosure and that various modifications may be made to that embodiment within the scope of the disclosure.

For example, while the ice breaking seal 14 is described as being formed of just two materials, it can, in accordance with the disclosure comprise more than two materials. Selected portions of the seal 14 may therefore be formed of other materials. For example, a radially outer, mounting portion 38 of the ice breaking section 20 may be formed from a different material or material mixture from the other sections which optimise the support of the seal 14 within the ball nut 4. In such a case, the ice breaking element 26 and the sealing element 30 may extend radially inwardly from the mounting portion 38. Thus, the apparatus 50 may have more than two deposition nozzles and supplies in various embodiments.

Figure 6:
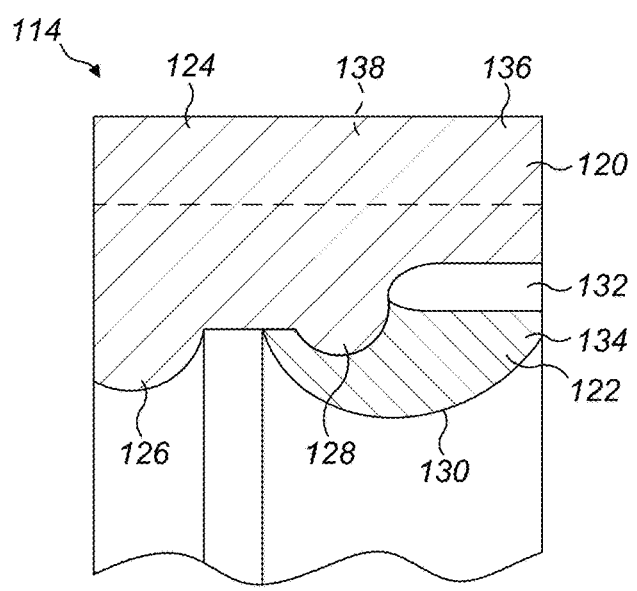
FIG. 6 illustrates a schematic cross-sectional view through a further embodiment of ice breaking seal in accordance with the disclosure.

FIG. 6 illustrates a further embodiment of the disclosure.

In the embodiment of FIG. 6, again a seal 114 includes an annular body 124 including a sealing section 122 which is integrally formed with an ice breaking section 120 and integrally attached to the ice breaking section 120 at an interface region 128. The ice breaking section 120 has an ice breaking element 126 and an outer mounting section 138. The sealing section 122 comprises a sealing element 130 which extends radially inwardly from the ice breaking section 120 for engagement in the helical channel 10 on the outer diameter 8 of the ball screw 6. In this embodiment, therefore, A radial gap 132 is provided between a distal portion 134 of the sealing element 130 and a distal portion 136 of the ice breaking section 120. The inner diameter of the sealing element 130 will generally be smaller than the outer diameter of the ball screw channel 10 and this radial gap 132 permits radially outward deformation of the sealing element 30, providing a resilient sealing engagement of the sealing element 130 within the helical groove 10.

The invention claimed is:

1. An ice breaking seal for a ball screw comprising a first, ice breaking section and a second, sealing section formed integrally as a continuous layer with the ice breaking section, the ice breaking section being formed of a polymeric material and having a first hardness and the sealing section being formed of a polymeric material and having a second hardness, which is lower than the first hardness.

2. An ice breaking seal as claimed in claim 1, wherein the ice breaking section and the sealing section are annular, the ice breaking section at least partially axially overlapping the sealing section.

3. An ice breaking seal as claimed in claim 2, wherein a radial gap is formed between a distal portion of the ice breaking section and a distal portion of the sealing section to allow radially outward deflection of the sealing section.

4. An ice breaking seal as claimed in claim 1, wherein the ice breaking seal comprises a radially outer mounting portion from which an ice breaking element and a sealing element of the sealing section extend.

5. An ice breaking seal as claimed in claim 4, wherein the outer mounting portion of the ice breaking element comprises a further polymeric material.

6. An ice breaking seal as claimed in claim 1, wherein the ice breaking section is made from synthetic rubber.

7. An ice breaking seal as claimed in claim 1, wherein the sealing section is made from synthetic rubber.

8. An ice breaking seal as claimed in claim 1, wherein the ice breaking section and sealing section are formed together in an additive manufacturing process, for example a photopolymerisation process.

9. A ball screw assembly comprising a ball screw received in a ball nut, the ball nut mounting an ice breaking seal as claimed in claim 1 for engagement with the ball screw.

10. A method of manufacturing an ice breaking seal comprising a first, ice breaking section and a second sealing section, the method comprising forming the ice breaking section and sealing section together as a continuous layer from polymeric materials using an additive manufacturing process, such that the ice breaking section has a first hardness and the sealing section has a second hardness, which is lower than the first hardness.

11. A method of manufacturing an ice breaking seal as claimed in claim 10, wherein the additive manufacturing process is a photopolymerisation process.

12. A method of manufacturing an ice breaking seal as claimed in claim 10, wherein the hardness of the icebreaking seal at any given location is achieved by co-depositing of materials having different hardnesses, the proportion of the materials deposited at any location determining the hardness of the material at that location.

13. A method of manufacturing an ice breaking seal as claimed in claim 10, wherein the ice breaking section and/or the sealing section is made from synthetic rubber.

14. An ice breaking seal for a ball screw, comprising:
a first, ice breaking section formed of a polymeric material and having a first hardness; and
a second, sealing section formed integrally as a continuous layer with an underlying interior facing surface of the ice breaking section, wherein:
the sealing section is formed of a polymeric material and has a second hardness, which is lower than the first hardness.

15. The ice breaking seal as claimed in claim 14, wherein:
the underlying interior facing surface of the ice breaking section is threaded, and
the sealing section conforms to a portion of the underlying interior facing surface of the ice breaking section that is threaded.

16. The ice breaking seal as claimed in claim 14, wherein a thickness of the sealing section, as measured inwardly from the underlying interior facing surface of the ice breaking section, decreases with increasing distance from respective distal portions of the ice breaking and sealing sections.

17. The ice breaking seal as claimed in claim 14, wherein:
the ice breaking section and the sealing section are annular with the ice breaking section at least partially axially overlapping the sealing section, and
a radial gap is formed between a distal portion of the ice breaking section and a distal portion of the sealing section to allow radially outward deflection of the sealing section.

* * * * *